May 8, 1923.
R. ROSE
LICENSE TAG HOLDER
Filed June 29, 1922
1,454,413
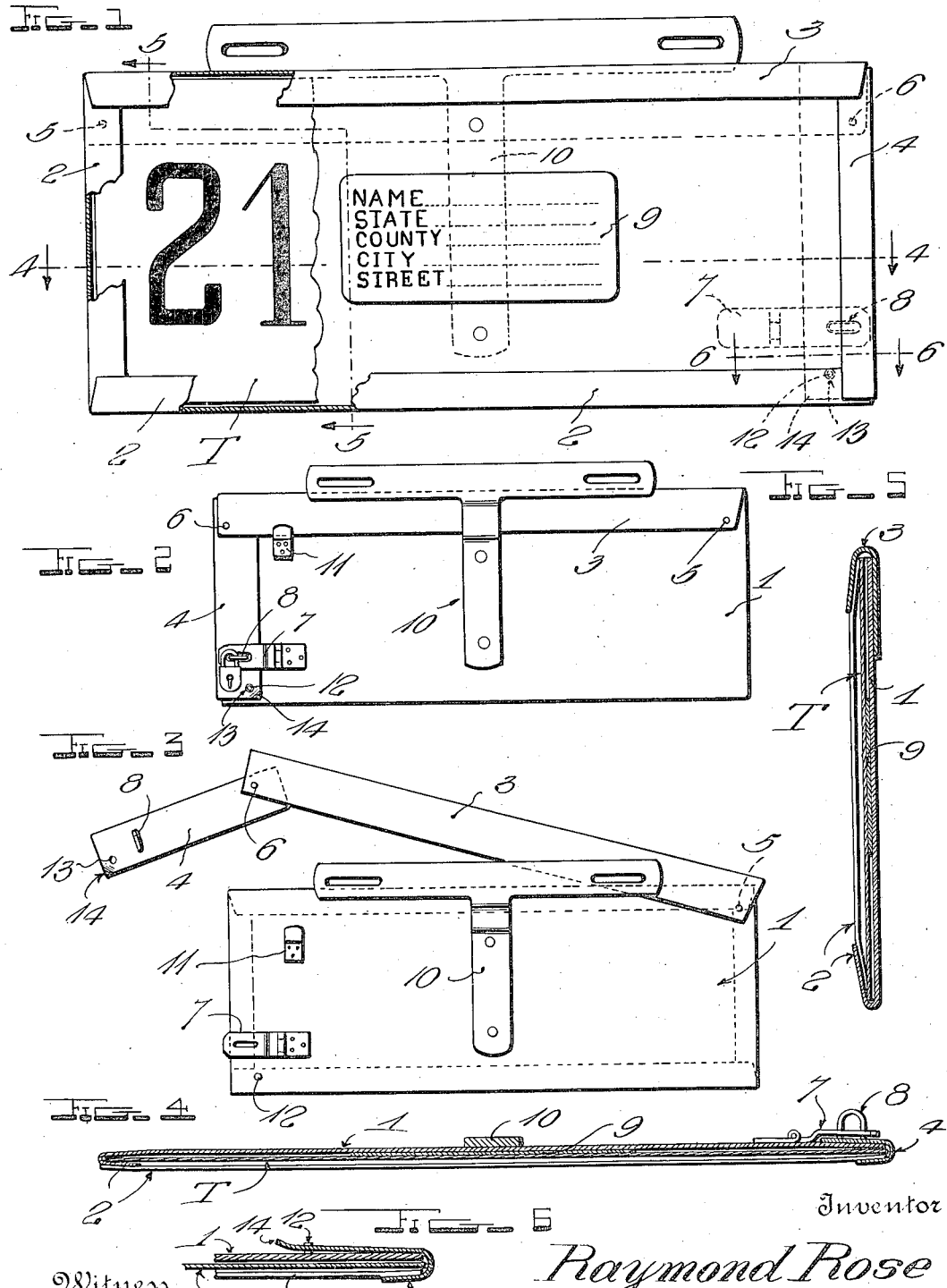

Patented May 8, 1923.

1,454,413

UNITED STATES PATENT OFFICE.

RAYMOND ROSE, OF NEW BRIGHTON, PENNSYLVANIA.

LICENSE-TAG HOLDER.

Application filed June 29, 1922. Serial No. 571,748.

*To all whom it may concern:*

Be it known that I, RAYMOND ROSE, a citizen of the United States, residing at New Brighton, in the county of Beaver and State of Pennsylvania, have invented certain new and useful Improvements in a License-Tag Holder; and I do declare the following to be a full, clear, and exact description of the invention, such as will enable others skilled in the art to which it appertains to make and use the same.

This invention relates to an improved holder for automobile license tags and the like.

The principal object of the invention is to generally improve upon holders of this class by producing one of comparative simplicity and durability which is practical, and such in construction that it will securely but removably retain the license tags in position.

Another object of the invention is to provide a license tag holder which embodies identification means which is positioned so that the tag covers it and renders invisible until the tag is removed, this arrangement enabling the owner of a stolen car to identify his car by removing the tag to expose the identification means.

More specifically speaking, it is a further object of the invention to provide a simple and inexpensive holder which comprises a plate against which the tag bears, together with a retractible rim for maintaining the tag in position and a key controlled lock for said rim.

Other objects and advantages of the invention will be apparent during the course of the following description.

In the accompanying drawings forming a part of this specification and in which like numerals are employed to designate like parts throughout the same:

Figure 1 is an elevational view, with portions broken away as shown in section, of a tag holder constructed in accordance with this invention.

Figure 2 is a rear elevation thereof.

Figure 3 is a view similar to Figure 2 showing the sections of the retaining rim retracted to permit removal or insertion of the tag.

Figure 4 is a longitudinal section taken on the line 4—4 of Figure 1.

Figure 5 is a transverse vertical section enlarged and taken on the line 5—5 of Figure 1.

Figure 6 is an enlarged detail section taken on the line 6—6 of Figure 1.

Specifically described, the improved holder comprises a substantially rectangular plate 1 which has its lower longitudinal edge and vertical left-hand edge inturned to provide retaining flanges 2 for the license tag T. Cooperative with the other two edges of the tag is a retaining rim composed of top and end sections 3 and 4 respectively. Each of these sections is substantially channel-shaped in cross-section and one end of the first named section is pivoted to one corner of the plate 1 as indicated at 5. To the opposite end of this section 3, the short section 4 is pivoted as shown at 6. These rim sections border the adjacent edges of the plate and the front flanges thereof are adapted to overlie the front portions of the tag to maintain it in position but to permit it to be removed when the sections are swung to the approximate position shown. It is of course desirable to provide means for maintaining the retaining rim in operative position, and although any other suitable means could be provided, I employ a hasp 7 which is hinged to the rear side of the plate 1 adjacent one corner and a staple 8 which is connected with the short rim section 4 for cooperation with this hasp, it being understood that a padlock (not shown) is used in connection with these. Furthermore, to act in conjunction with this locking means I provide a projection 12 on the rear face of the plate 1 at the lower left-hand corner, this projection being intended for reception in a small hole 13, in the rim section 4. To facilitate co-acting of these and to render the operation automatic, the corner of the rear flange of the section 4 is outbent as at 14 so that it will ride over the projection and guide it into the hole 13.

It is to be noted here as before indicated, that identification means is employed, this means being preferably in the form of a supplemental plate 9 which is secured in any suitable way to the front side of the plate 1 at the center thereof. It is understood that this plate is intended to disclose the name, residence, etc., of the owner of the holder. When the tag is in operative place, it entirely covers this identification means and renders it invisible. This is adtantageous in that in case the car is stolen and then located, it can be readily identified by the owner by removing the lock and then taking out the tag to expose the identification plate 9.

For the purpose of connecting the holder with the automobile, I employ a substantially T-shaped attaching bracket 10, the horizontal cross-arm of which is slotted to permit it to be bolted or otherwise is secured in place on the machine.

Although it is not essential, I prefer, in practice to secure a small stop 11 to the rear side of the plate to secure rigidity of construction and to limit the swinging movement of the long section 3 of the retaining rim in one direction.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. An automobile license tag holder comprising a backing plate having one end and one longitudinal edge bent to provide a pair of flanges adapted to engage two edges of a tag, and a retaining rim for connection with the remaining end and longitudinal edge of the plate, said rim comprising relatively long and short channel shaped sections, said sections being pivotally connected together at one end, the opposite end of the long section being pivotally connected to the plate at one corner of the latter, and locking means for connecting the free end of the short section with the plate for holding the tag in position against the latter.

2. An automobile license tag holder comprising a plate having one end and one longitudinal edge bent to provide a pair of flanges for engaging the two adjacent edges of the tag, a relatively long channel-shaped member adapted to engage the other longitudinal edge of the tag, said member being pivotally connected at one end to one corner of the plate, a relatively short channel-shaped member to engage the remaining edge of the tag, said short member being pivotally connected at one end to the free end of said first named member, one flange of said short member being formed with an opening, a staple on the plate to extend through said opening, and a stop on the rear side of the plate with which the free end of the long member is engaged.

In testimony whereof I have hereunto set my hand.

RAYMOND ROSE.